United States Patent
Huston et al.

(10) Patent No.: US 6,733,173 B1
(45) Date of Patent: *May 11, 2004

(54) PYROMETER FOR MEASURING THE TEMPERATURE OF A GAS COMPONENT WITHIN A FURNACE

(75) Inventors: John T. Huston, Lancaster, OH (US); John W. Berthold, Salem, OH (US); Thomas E. Moskal, Pickerington, OH (US)

(73) Assignee: Diamond Power International, Inc., New Orleans, LA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/770,609

(22) Filed: Dec. 19, 1996

(51) Int. Cl.$^7$ .................................................. G01J 5/00
(52) U.S. Cl. .................. 374/121; 374/130; 374/125; 374/123
(58) Field of Search ................. 374/130, 121, 374/125, 123, 128, 141

(56) References Cited

U.S. PATENT DOCUMENTS

| | | | | |
|---|---|---|---|---|
| 3,584,509 A | * | 6/1971 | Compton | 374/123 |
| 3,696,678 A | * | 10/1972 | Mossey | 374/104 |
| 3,777,568 A | * | 12/1973 | Risgin et al. | 374/128 |
| 3,862,574 A | * | 1/1975 | Antoine et al. | 374/121 |
| 4,142,417 A | * | 3/1979 | Cashdollar | 374/110 |
| 4,326,798 A | * | 4/1982 | Kahn | 374/144 |
| 4,409,042 A | * | 10/1983 | Dornberger et al. | 374/130 |
| 4,410,266 A | * | 10/1983 | Seider | 356/43 |
| 4,552,098 A | * | 11/1985 | Wynnyckyj et al. | 122/379 |
| 4,579,461 A | * | 4/1986 | Rudolph | 374/9 |
| 4,619,533 A | * | 10/1986 | Lucas et al. | 374/125 |
| 4,648,711 A | * | 3/1987 | Zachary | 374/130 |
| 4,764,025 A | * | 8/1988 | Jensen | 374/128 |
| 4,836,689 A | * | 6/1989 | O'Brien et al. | 374/125 |
| 4,867,574 A | * | 9/1989 | Jenkofsky | 374/130 |
| 4,874,572 A | * | 10/1989 | Nelson et al. | 376/256 |
| 5,051,590 A | * | 9/1991 | Kern et al. | 250/339 |

(List continued on next page.)

FOREIGN PATENT DOCUMENTS

| | | | | |
|---|---|---|---|---|
| DE | 0398175 | * | 7/1924 | 374/130 |
| DE | 1152835 | * | 8/1963 | 374/123 |
| EP | 0018642 | * | 11/1980 | 374/123 |
| GB | 2133877 | * | 8/1984 | 374/123 |
| SU | 0312151 | * | 8/1971 | 374/123 |

OTHER PUBLICATIONS

The Diamond Power Specialty Company, Product Information sheet for "GASTEMP", published on or about Nov., 1996.

Primary Examiner—Diego Gutierrez
Assistant Examiner—Lydia M. De Jesús
(74) Attorney, Agent, or Firm—Eric Marich

(57) ABSTRACT

A pyrometer for use in measuring temperatures in a furnace, has a lens-tube for supporting an optical head in a port of the furnace for viewing an interior of the furnace along a line of sight. The optical head converts infrared radiation to electrical signals. A photometer circuit connected to the optical head processes the electrical signals and a scaling circuit connected to the photometer circuit scales the electrical signals. An output circuit connected to the scaling circuit receives the scaled electrical signals and produces output signals for display or control of the furnace. A power supply connected to the scaling circuit powers the photometer, scaling and output circuits. Calibration in the scaling circuit scales the electrical signals to be most sensitive to a wavelength of middle infrared radiation to which at least one gas component in the furnace is semi-transparent, for measuring the temperature of the at least one gas component.

16 Claims, 4 Drawing Sheets

U.S. PATENT DOCUMENTS

| | | | |
|---|---|---|---|
| 5,112,215 A | 5/1992 | Frish et al. | 431/3 |
| 5,219,226 A * | 6/1993 | James | 374/124 |
| 5,275,553 A | 1/1994 | Frish et al. | 431/76 |
| 5,355,845 A * | 10/1994 | Burgess et al. | 374/121 |
| 5,421,652 A * | 6/1995 | Kast et al. | 374/208 |
| 5,612,676 A * | 3/1997 | Plimpton et al. | 340/578 |
| 5,634,412 A | 6/1997 | Martin et al. | 110/101 |

* cited by examiner

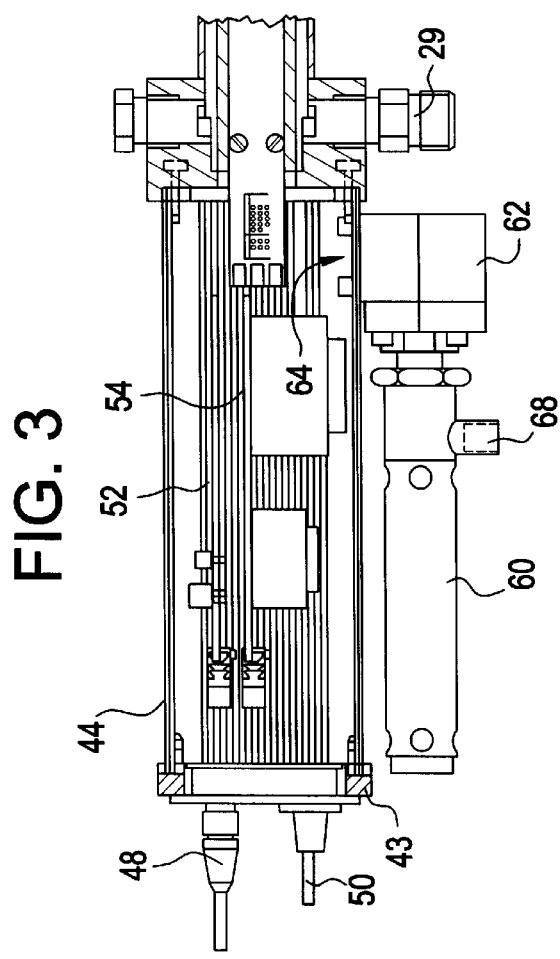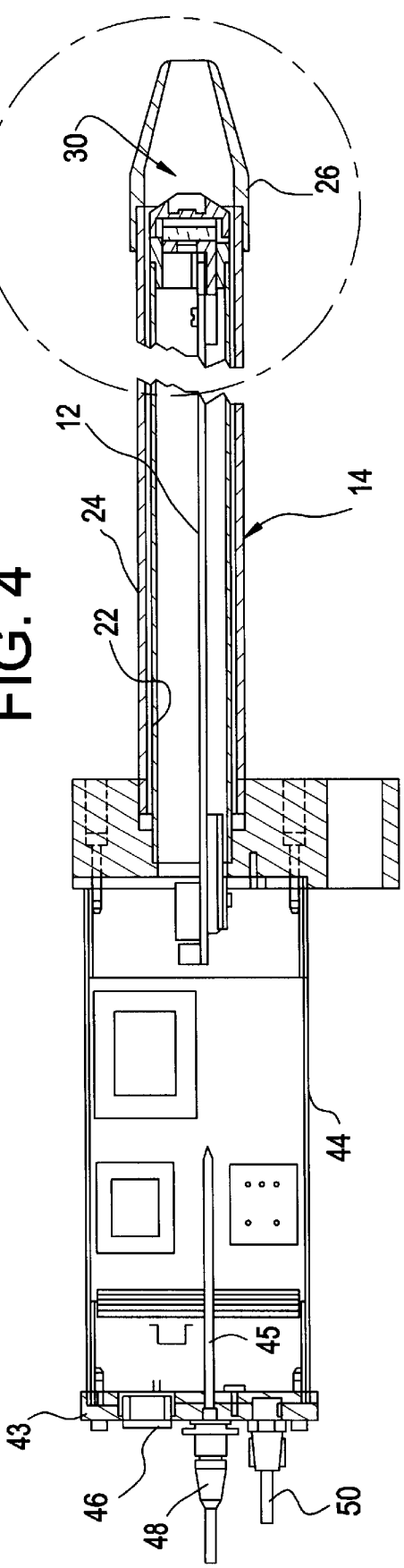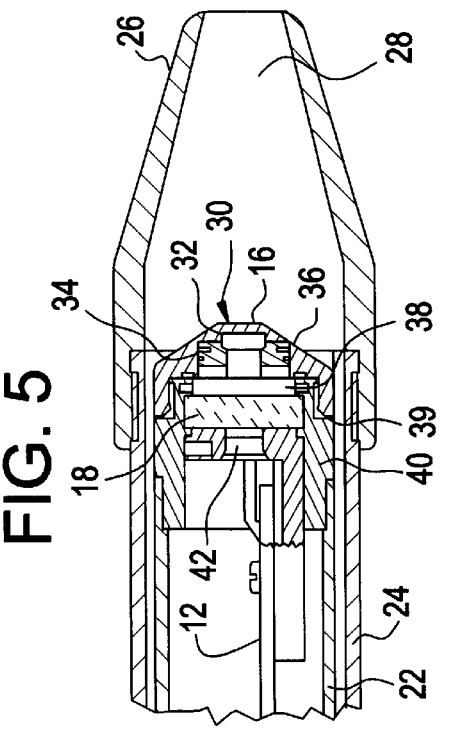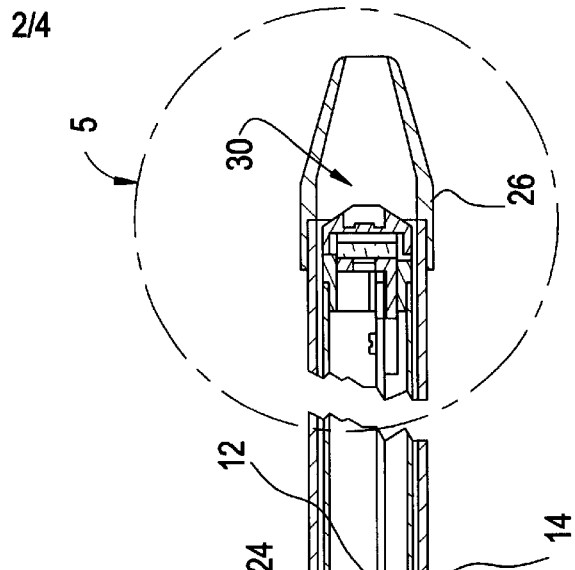

PYROMETER FOR MEASURING THE TEMPERATURE OF A GAS COMPONENT WITHIN A FURNACE

BACKGROUND OF THE INVENTION

1. Field of the Invention

The present invention relates in general to temperature sensors, and in particular, to a new and useful optical pyrometer for measuring furnace gas temperatures.

2. Description of the Related Art

Prior devices have measured the temperature of entrained fly ash to determine gas temperature, limiting their application to only fuels with a high ash content. The present invention measures the temperature of actual constituent gases, thereby providing accurate temperature measurement with any fuel.

Radiation pyrometry, more commonly called optical pyrometry, measures the temperature of a substance by measuring the thermal radiation emitted by the substance.

Thermal radiation is a universal property of matter that is present at any temperature above absolute zero. Optical pyrometry utilizes the fact that the thermal radiation emitted by most substances is continuous over a spectral range of approximately 0.3 micron to 20 microns. This spectral range encompasses ultraviolet (UV) radiation, up to 0.38 micron; the visible (VIS) range, 0.38 to 0.78 micron; and infrared radiation (IR), 0.78 to 20.0 micron. IR radiation is further divided into three segments, near IR (0.78 to 3.0 micron), middle IR (3.0 to 6.0 microns), and far IR (above 6 microns).

The distribution of the thermal radiation of a substance over the spectral range is a function of both the temperature and emissivity of the substance. Higher temperatures shift the distribution toward the shorter wavelengths; lower temperatures shift the distribution toward the longer wavelengths. Higher emissivity increases the thermal radiation at any given temperature, whereas lower emissivity reduces the thermal radiation at the same temperature. A perfect thermal radiator is called a black-body, and has an emissivity of 1.0. Thermal radiators that are not perfect and that emit thermal radiation in the same spectral distribution as a black-body, but at reduced intensity, are called gray-bodies and have emissivities from zero to 1.0.

Emissivity can vary equally over the spectral range, called total emissivity; or it can vary as a function of the wavelength over the spectral range, called spectral emissivity. Both total emissivity and spectral emissivity can also vary as a function of the temperature of the substance. All of these emissivity variations can occur independently and simultaneously.

Scattering and absorption are two other important phenomena that affect intensity and distribution of the thermal radiation propagating through a medium, as well as the transmission distance (effective depth) through the medium. Scattering diffuses the thermal radiation, is highly dependent on both the species and physical size of the constituents of the medium, and increases singnificantly as the wavelength decreases. Absorption of thermal radiation is generally wavelength specific; the absorbed wavelength(s) being dependent upon the species that are exposed to the thermal radiation.

Optical pyrometry utilizes all of these radiating and propagating properties of matter to ascertain the temperature of a substance through a medium by measuring the intensity of the thermally radiated UV, VIS or IR energy of the substance. The radiating properties of matter are defined by Planck's equation for spectral emissivity and the Stefan-Boltzmann law for total radiated energy. The propagating properties through a medium are defined by the Boujuar-Lambert law for absorption and the Rayleigh and Mie equations for scattering.

Optical pyrometers can be either narrow bandpass or broad bandpass instruments. Typically, narrow bandpass optical pyrometers utilize Planck's equation to determine temperature, whereas broad bandpass optical pyrometers use the Stefan-Boltzmann law. Optical pyrometers are also classified according to the particular wavelength(s) utilized in determining the measured temperature, i.e., UV, VIS, or IR. Usually, the shorter wavelengths (UV, VIS and near IR) are used for higher temperature measurements, whereas longer wavelengths (middle and far IR) are used for lower temperature measurements.

Successful implementation of any optical pyrometer requires an extensive analysis of the application to determine the proper wavelength, bandpass and emissivity based on the characteristics of the measured substance over the desired measurement temperature range. Additionally, scattering and absorption in the propagating medium must also be considered to ensure that the measured thermal radiation is actually proportional to the measured temperature, and also to ensure the correct measurement depth into the propagating medium. This is especially important for boiler/furnace applications because the measured substance according to the present invention, flue-gas, is quite nebulous and its constituents can vary widely over normal operating conditions.

Without conducting the proper application specific analysis, most optical pyrometers cannot reliably and accurately measure boiler/furnace fireside gas temperatures. Typical VIS and broad bandpass IR type devices have a very short effective depth, and only measure the near-field temperature. Typical narrow bandpass IR type devices have an extremely long effective depth, and are greatly influenced by the opposite wall surface temperature.

U.S. Pat. Nos. 5,112,215 and 5,275,553, which are both incorporated here by reference, disclose optical pyrometers for measuring temperature based on single and double wavelength measurements of radiation from fly ash in a furnace.

SUMMARY OF THE INVENTION

The invention is an optical pyrometer which is based on Planck's equation and which utilizes specific wavelengths to measure the actual temperature of constituent gases in the furnace and the convection pass section of a boiler. Specifically, the invention uses 1.38 micron infrared radiation to measure the temperature of $H_2O$ in a constituent gas that is a product of combustion of any hydrocarbon or carbon fuel. Alternative ranges of wavelengths are 1.3 micron 1.8 to 2.0 micron and 2.3 to 3.1 micron, providing temperature measurement of $H_2O$, $CO_2$, or mixtures of $H_2O$ and $CO_2$.

The invention is primarily intended for applications on pulverized coal fired boilers, with boiler widths of 40 to 100 feet, and for all types and classes of coals. The standard calibration for the invention is made for measuring fireside gas temperatures from the furnace exit through the convection pass. With proper wall penetration hardware, the invention can be used on all normal forced draft, balanced draft, and induced draft boilers.

The invention can be used as a field diagnostic tool as well as a permanently installed on-line monitor. As a diagnostic tool, it can be used as a stand alone instrument, or along with data acquisition equipment to record data for extended tests. As a permanently installed on-line monitor, it can also stand alone or serve as an integral part of a larger system to implement automatic monitoring and control.

The invention, being an optical pyrometer, will measure temperature based on the light intensities that it sees. However, it is specifically tuned and calibrated to measure fireside gas temperature. Hence, it will not provide an accurate temperature reading of solid objects nor any other medium than fireside gas streams.

The invention measures the average temperature of a gas in a solid cone of about 6 degrees, along the line-of-sight of its lens-tube axis, over the entire length of the line-of-sight. The actual measurement contribution from any point within the cone of view varies with the fourth power of the temperature of the point; and also as a decreasing exponential into the gas stream depth. Hence, the average temperature indicated by the invention will be weighted toward the highest temperature in the field of view, and also slightly more toward the near-field rather than the far-field. The actual depth of measurement is also a function of optical scattering, consequently it will vary slightly with gas-stream particle load, gross unit, load, and excess air.

The invention requires an unobstructed field of view of the measurement area, especially in the near field. The 6 degree conical field-of-view equates approximately to a diameter of 5 feet at a distance of 50 feet. However, since the measurement contribution from any point decreases exponentially with distance, partial obstructions such as pendants and wing walls beyond a distance of 50 feet have very little effect on accuracy.

The accuracy of the invention is about +/-50 F. for normal pulverized coal fired utility boilers with furnace widths of 40 to 100 feet. Furnace widths of less than 40 feet may require special calibration to provide the specified accuracy. Furnace widths greater than 100 feet may require multiple units to provide full width temperature coverage.

Since the invention is tuned for specific gas species in the fireside gas stream, the opposite walls have very little influence on its measurement accuracy. Also, since the opposite walls are farthest from its objective lens, their effect is minimized by the exponential decrease of response with distance.

The usual measuring temperature range for the invention is 1000 F. to 2800 F. (approximate). Special calibration for other temperature ranges can be provided to lower the range to 700 F. minimum or increase the range to 3000 F. maximum, without degradation of measurement accuracy.

The invention is designed for installation at any location from the furnace exit, throughout the convection pass section. It can be installed at any standard furnace observation port, or any other wall penetration, i.e., sootblower or thermoprobe location, etc. A suitable wall box should be installed in the boiler wall for permanent installations.

For accurate measurement, the invention should be installed at a location with a 40 to 100 foot line-of-sight. For most boilers this is across the boiler width rather than from front wall to rear wall. Special care should be taken to avoid nearness to corners, pendants and wing walls that can restrict the 6 degree conical field-of-view in the near field. The optical head includes a lens for focusing infrared radiation from a line-of-sight cone of a solid angle of about 3 to 8 degrees from the furnace.

The invention is not intended to measure actual combustion temperature. Generally, the 1000 F. to 2800 F. measurement range will inherently prevent installation too close to the furnace combustion zone. However, for some applications, combustion temperatures can be less than 2800 F., and care should be exercised to ensure that the measurement zone is well clear of the combustion zone.

Since the average temperature indicated by the invention is weighted toward the highest temperature in the field of view, and also toward the near-field rather than the far-field, multiple units can be utilized to indicate temperature variation across the furnace width. For best results, the furnace width should be 50 feet or greater, and the units should be installed in pairs; one on each sidewall, on opposite ends of the same line-of-sight.

An object of the present invention is to provide a furnace pyrometer which is specially designed to achieve the foregoing functions in an effective manner.

A further object of the present invention is to provide a furnace pyrometer which is specially designed to sense the intensity of intermediate infrared radiation which is characteristic of one or more specific gas constituents generated by the combustion of hydrocarbon or carbon fuel including coal, natural gas, oil, organic matter or other combustible fuel.

A still further object of the present invention is to provide a pyrometer which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

BRIEF DESCRIPTION OF THE DRAWINGS

In the drawings:

FIG. 3 is a horizontal sectional view of the enclosure portion of the pyrometer according to the present invention;

FIG. 4 is a vertical sectional view of the pyrometer of the present invention;

FIG. 5 is an enlarged vertical sectional view taken from area 5 FIG. 4;

DESCRIPTION OF THE PREFERRED EMBODIMENT

Figure 1:
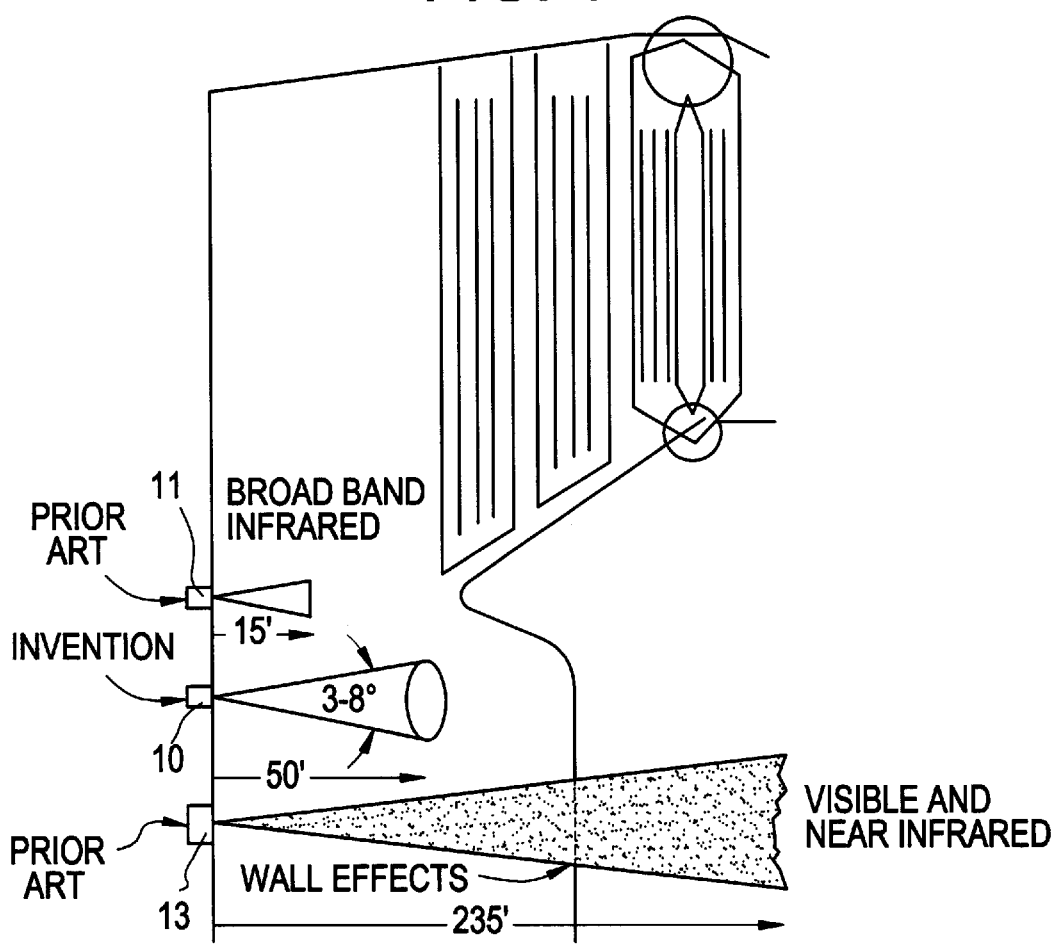
FIG. 1 is a schematic representation showing the placement of the present invention and its field of view compared to prior art pyrometers.

The pyrometer of the present invention, generally designated 10 in FIG. 1, is smaller, more cost effective and directly measures the actual furnace gas temperature rather than the entrained fly ash temperature, which was the case for prior art pyrometers shown at 11 and 13 in FIG. 1. Also as shown in FIG. 1, the direct measurement of furnace and convection pass gas temperatures is effective deeper into the furnace than with regard to fly ash measurements obtainable by prior art pyrometer 11. Additionally, the depth of measurement of the present invention is shallower than that of prior art pyrometer 13 and lies within the confines of the furnace, thus avoiding undesirable wall effects on temperature measurements associated with prior art pyrometer 13. Direct gas temperature measurement with the present invention also provides direct evidence of boiler cleaning effectiveness. Inadequate cleaning causes furnace slagging, convection pass fouling and increased NOx emissions. The pyrometer of the present invention measures gas temperature by simply aiming its lens through any available inspection port in a boiler.

Figure 2:
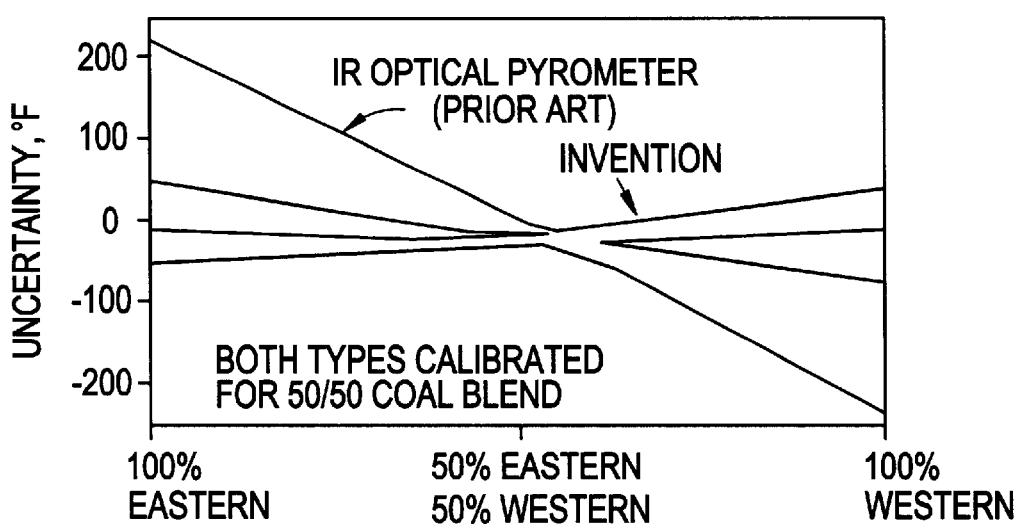
FIG. 2 is a graph plotting the uncertainty in temperature against coal composition for different blends, comparing the error in known pyrometers to the error of the present invention.

The advantages of measuring gas temperature rather than fly ash temperature are evident in FIG. 2 which compares errors in temperature measurement to coal mixtures from 100% Eastern coal which in the prior art pyrometer gave an error from about 50 to about 250 F. above actual, to 100% Western coal which gave an error of about −50 to −250 F. This is compared to the uncertainty of the present invention which varies between about +/−50 F. for the same coal compositions.

Also shown in FIG. 1, the present invention, by being constructed and calibrated for specific IR wavelengths of gases which are known to be present, has a depth of measurement of from about 40 to about 100 feet into the furnace.

The selection of wavelengths for which the present invention is particularly sensitive is an important aspect of the invention.

A wavelength for which the gas is transparent would result in a measurement of the temperature of the opposing wall. On the other hand, a wavelength for which the gas is opaque would result in a measurement of the gas temperature at the near wall. What is desired is a wavelength for which the gas is semi-transparent.

Mathematically, the transmission T through the hot gas can be written as $$T(y) = e^{-k(y)(H2O)X}$$

where k(y) is the spectral absorption coefficient
[H$_2$O] is the concentration of H$_2$O
X is the path length. The desired wavelength will be one for which T is essentially zero for values of X≧ the distance to the far wall and for which T is nearly 1 for values of X≦2 feet.

FIGS. 3–8 illustrate the construction of the present invention.

The invention utilizes a THROUGH-THE-LENS-PYROMETER (TLP) circuit 12 (FIG. 4) of the type used with known IR cameras, and utilizes much of the compact, rugged hardware of the CARRY-OVER-MONITOR-SYSTEM (CMS). A CMS lens-tube 14 provides mounting for the detector (photometer) circuit 12, objective lens 16 (FIG. 5), and IR bandpass filter 18. A CMS air-shroud, made up of inner and outer concentric tubes 22, 24, provides a means to cool the internal lens-tube components and aspirate the objective lens 16.

The shroud formed by outer tube 24 ends at a cap 26 having an aperture 28. Cooling gas is supplied by a fitting 29 shown in FIG. 3, and the cooling gas flows between the inner and outer tubes, 22, 24 to the interior of cap 26 wherein it is directed to purge the lens-tube components as it leaves the cap 26.

As shown in FIG. 5, the optical head generally designated 30 of the pyrometer also includes a sapphire window 32, a lens retainer 34, a lens housing 36, a gasket 38, an O-ring 39, a filter holder 40 and an optical detector 42 in the form of a germanium photodiode.

The lens-tube 14 and air-shroud are mounted on the front of a small watertight electronics enclosure 44 that houses additional circuitry that provides temperature scaling and DC power. This enclosure also houses a digital display 46 and analog output connector 48, both mounted on the rear panel 43. Incoming 120/240 VAC, 50/60 HZ power is via water tight cable 50 through the enclosure rear panel. Rear panel 43 also carries an analog thermometer 45 for monitoring the enclosure temperature which must be below 130 F.

The circuitry for the invention is divided into three basic sections, and is mounted on three separate circuit boards: the photometer circuit on circuit board 12; a scaling circuit on circuit board 52; and the power supply circuit on circuit board 54.

Figure 8:
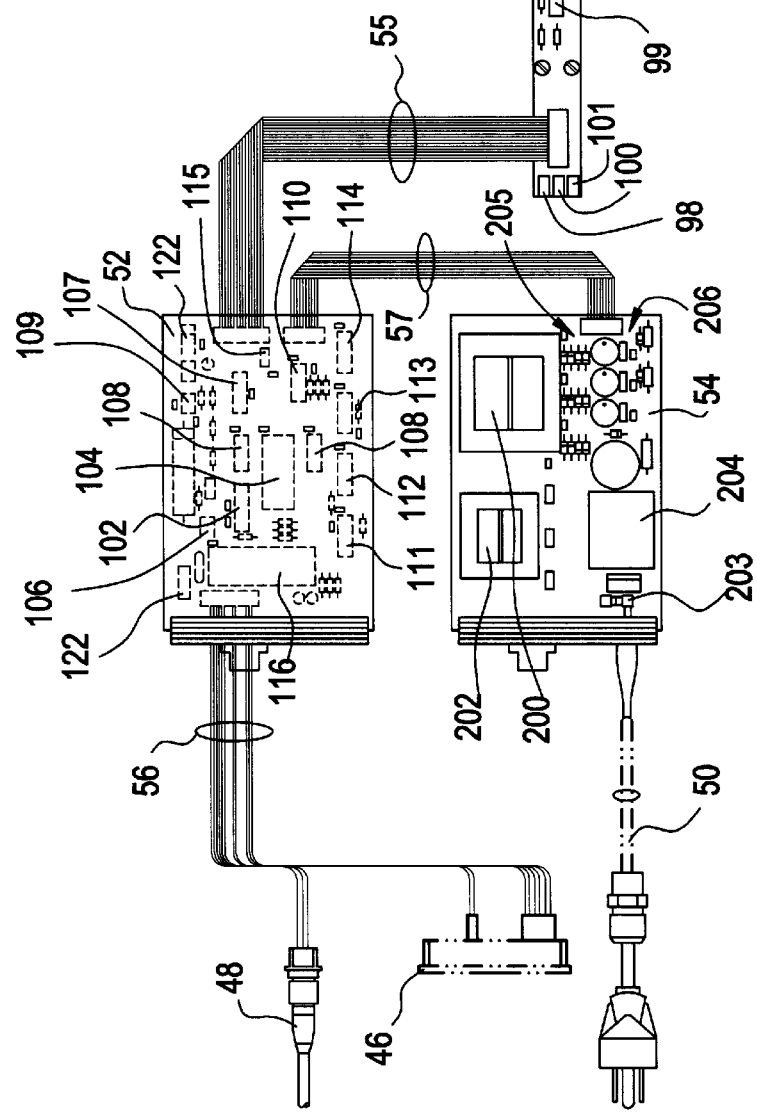
FIG. 8 is a view of the circuit components of the present invention removed from their enclosures.

The photometer circuit 12, an adaptation of the TLP detector circuit, consists of the germanium photodiode 42 and conventional transimpedance amplifier circuit. An offset adjustment is provided for zero calibration, and an adjustable gain stage is provided for full scale calibration, all on circuit board 12. A 125 second integrator eliminates measurement flicker, and an emissivity adjustment stage allows for application specific calibration, i.e. field calibration, if necessary for special applications. Circuit 12 is connected to the circuit in the board 52 by a cable 55 as best seen in FIG. 8.

The scaling circuit board 52 consists of both the scaling circuit and an analog output circuit.

The scaling circuit converts the photometer circuit's output to an equivalent temperature signal for the digital display 46 and analog output circuit. These signals are sent along a cable 56. The scaling circuit also has an internal autocalibration feature that eliminates the need for fine tuning adjustments and compensates for ambient temperature drift during operation. Autocalibration is invoked every 76 seconds during operation.

The analog output circuit which is also on circuit board 52, consists of an isolated voltage-to-current (V/I) converter that provides the 4 to 20 milliamp analog output signal and the 1500 volt isolation. The V/I converter output is provided with an internal, isolated, 24 VDC power supply for self-powered, stand-alone operation; or it can be directly connected in any loop powered system. Separate pins are provided in the output connector for each option. Both output options are protected by a common surge suppressor and fuse.

The power supply circuit 54 provides the necessary power conversion and isolation for all of the other circuitry and is connected to board 52 by a cable 57. An internal fuse provides short circuit protection and an internal power line filter suppresses incoming and outgoing conducted Electromagnetic-Interference (EMI). Jumpers on the power supply circuit board provide selection of 120 or 240 VAC 50/60 HZ incoming power. These are plug-on jumpers, initially configured for 120 VAC 50/60 HZ, but can be easily reconfigured for 240 VAC 50/60 HZ operation.

The digital display 46 is a 0 to 2 VDC (1.9999 volt), 4½ digit LCD panel meter with back lighting. Only 4 of the digits are used and the decimal point is disabled.

Cooling in enclosure 44 is by compressed air supplied to a vortex cooler 60 with a block 62 for supply of cool air at 64 and exit at 66. Air supply is at 68.

Figure 6:
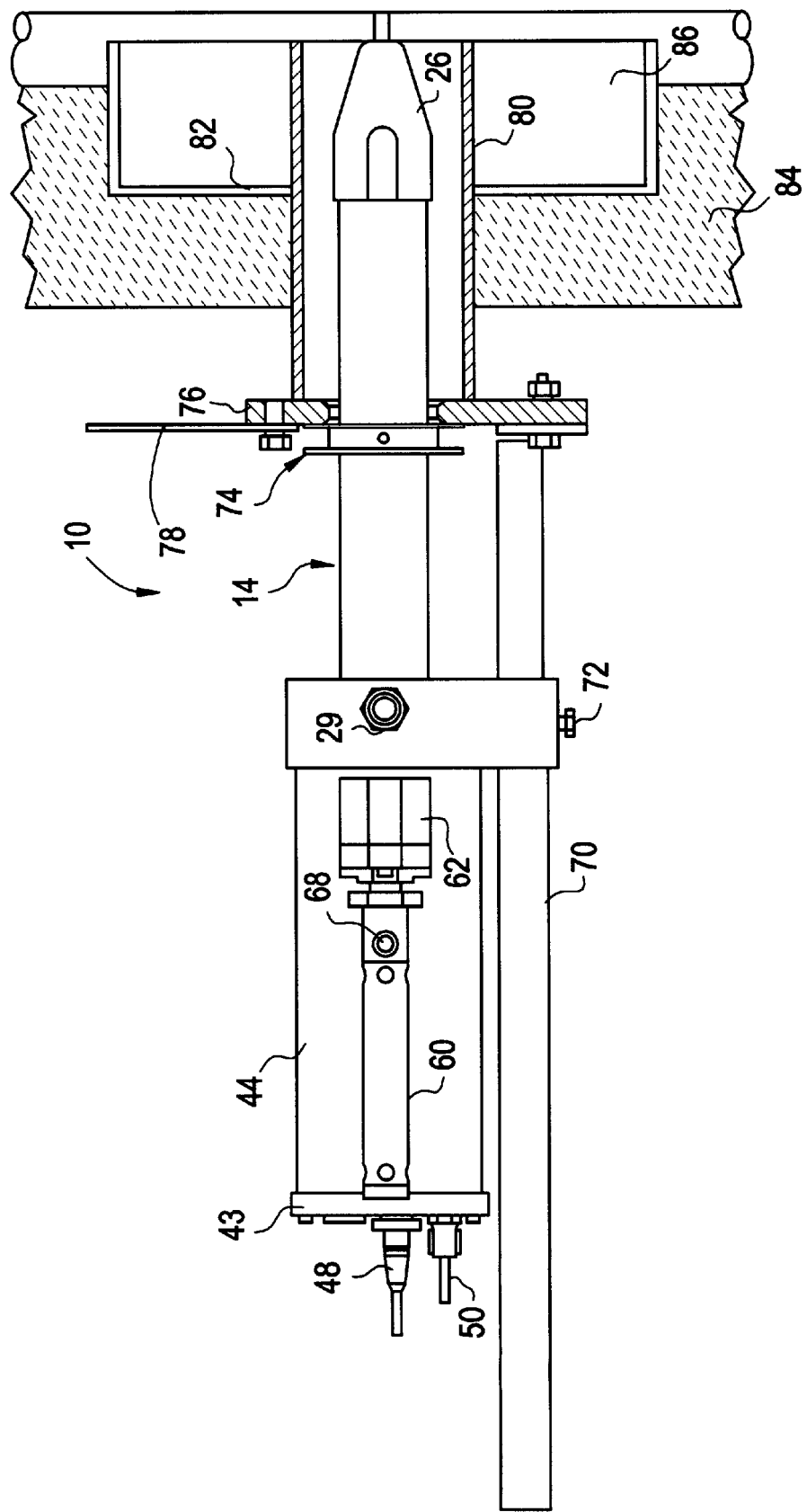
FIG. 6 a side elevational view of the present invention mounted in the wall of a furnace and with representative dimensions shown in the figure.
Figure 7:
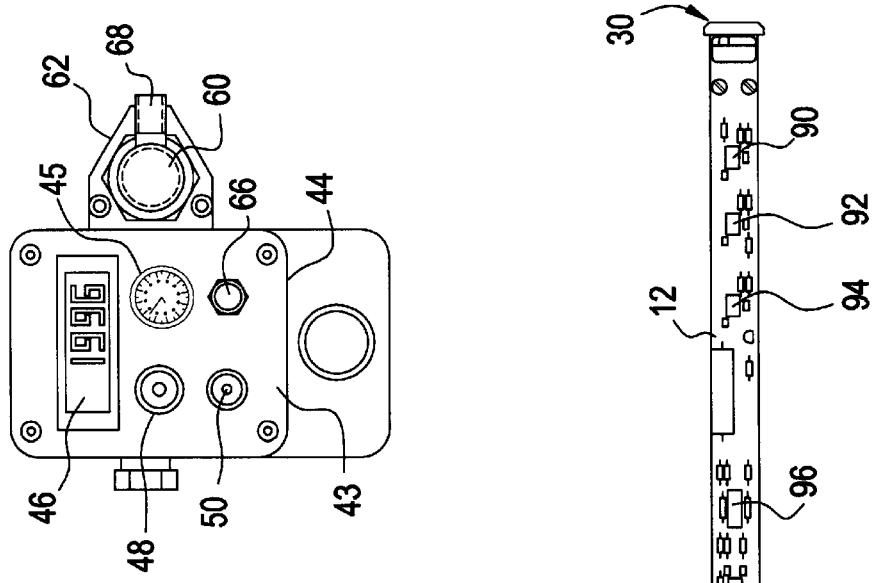
FIG. 7 is a rear elevational view of the pyrometer of the present invention.

As best shown in FIG. 6, the pyrometer 10 of the present invention can be inserted and retracted along a rod 70 and held in place by a set screw 72. Tube 14 has a heat shield 74 mounted thereon so as to have a portion of tube 14 beyond the heat shield 74 extending through a mounting flange 76 having a seal plate 78. The tube extends into a pipe sleeve 80 which encloses the portion of the tube containing cap 26, sleeve 80 extending into a wall port 82 in the furnace wall 84. Heat transfer tubes in the wall are represented by a tube 86 with the port 82 being provided between two adjacent tubes.

Referring to FIG. 8, the photometer circuit with the germanium photodiode has a conventional transimpedance amplifier circuit 90 that determines dynamic measurement range, an adjustable gain stage for full scale calibration at opamp 94, an offset adjustment stage for minimum scale calibration at opamp 92, an integrator with a total settling of 125 seconds to overcome measurement flicker at opamp 96 and an emissivity adjustment stage for field calibration also at opamp 96.

The gain 98 and offset 100 adjustments provide a means to calibrate photometer circuit response to a black-body calibration (temperature) source.

The emissivity adjustment provides a means for application specific field adjustment, if necessary, and is physically located at 115 on the scaling/output circuit board.

Additional support circuitry on this board consists of a thermistor (RT) controlled photodiode heater (HTR) with adjustable temperature setting opamps and an analog switch 99 that provides a calibration reference voltage for field adjustment of emissivity.

A fixed resistor may be substituted for an adjustable temperature setting potentiometer 101 for the photodiode heater.

The scaling circuit 52 consists of an Analog/Digital Converter (ADC) 107, a Programmable Read Only Memory (PROM) 104, a Digital/Analog converter (DAC) 102 and clock/timing support circuitry. The ADC digitizes the 0 to 10 volt intensity signal from the photometer board into a unique PROM address. Each PROM address location contains a corresponding predetermined digital temperature value for each digitized intensity. The DAC then converts the digital temperature value at the PROM address back into a 0 to 5 volt analog signal representative of temperature.

The particular ADC selected for the scaling circuit (AD677) has an internal autocalibration feature that eliminates the need for fine tuning adjustments and also compensates for ambient temperature drift during operation. Since the incremental resolution of the incoming signal to the ADC is approximately 150 microvolts per bit (corresponding to approximately 10 F. change at low end of scale), this feature is necessary to eliminate excessive measurement drift at the low end of the measurement range. Autocalibration is invoked every 76 seconds during operation.

It should be noted that the ADC output code is the bipolar twos complement of the input signal. In order to accommodate this data format, the 0 to 10 VDC intensity signal from the photometer board is converted to −5 to +5 VDC bipolar input signal by opamp 109 and voltage reference 122. Also, since the ADC output is 16 bit serial format, two 8 bit shift registers 108 are used to convert the ADC output to parallel format for the PROM. The twos compliment output code from the shift registers is then converted to offset binary code for the PROM address by inverting the most significant bit with a NAND-gate.

The 8 bit parallel digital output data from the PROM is converted to a 0 to 2 milliamp output signal by the DAC. The DAC output signal is then converted to a 0 to 5 VDC signal by opamp 106.

The clock/timing circuitry provides all of the essential signals to initiate the ADC conversion, read data from the PROM, write data to the DAC and autocalibrate the ADC. The basic clock circuit is an R/C relaxation oscillator utilizing NAND-gate 110 to provide the approximate 900 KHZ CLK signal to the ADC and also to the additional timing circuits for ADC data sampling (SAMP), PROM output enable (OE) and DAC write (WR), ADC autocalibrate (CAL), and DAC disable (CE) during autocalibrate. These additional timing functions are derived from the CLK signal by binary counter dividers 112, 114 and one-shot multivibrator pulse shapers 111, 113.

The SAMP pulse is a 10.6 microsec pulse at a 144 microsec period (approximately 7 KSPS sample rate), generated by dividing the CLK signal by 128 with binary counter 114 and one-shot multivibrator 113. The ADC samples the input signal (VIN) on each occurrence of the falling edge of the SAMP pulse. This sample rate is approximately seven times the minimum sample rate for the ADC, thus ensuring that excessive ADC droop does not occur between samples. During the SAMP pulse the CLK signal to the ADC is gated off by NAND-gate 110 to prevent digital feedthrough noise from the CLK input to the ADC. The ADC requires approximately 19 microsecs to complete a conversion.

The UPDATE signal is a 1.2 microsec pulse at an 18.4 millisec period (approximately 54 times per second), generated by dividing the CLK signal by approximately 16,000 with binary counter 114 and one-shot multivibrator 113. This pulse is negative true, and triggers the PROM to read the address from the ADC on the leading (falling) edge; the PROM's output data is valid approximately 200 nanosecs later. The trailing (rising) edge of this same pulse triggers the DAC to latch the output data from the PROM. The DAC output is then updated to new data approximately 100 nanosecs later. This results in updating the analog output and digital display approximately 54 times per second. An integrator at opamp 109, with a total settling time of approximately 3 seconds, smooths the DAC output signal to analog output and display.

The ADC CAL signal is a 10.2 microsec pulse at approximately 76 second intervals, generated by dividing the CLK signal by 67,000,000 with binary counters 114 and 112 and one-shot multivibrator 111. Autocalibration of the ADC requires approximately 96 millisecs. At the start of autocalibration the CALDIS signal, a 127 millisec pulse generated by one-shot multivibrator U14B, disables the SAMP and UPDATE pulses and the DAC chip enable (CE) thus preventing erroneous data from occurring during and immediately following calibration.

An isolated voltage-to-current (V/I) converter 116, with 1500 volt isolation capability, converts the 0 to 5 VDC signal from the DAC and opamp 106 to the 4 to 20 milliamp analog output signal. The V/I converter output is provided with an isolated 24 VDC power supply for self-powered, stand-alone operation; or it can be directly connected in a loop powered system. Separate pins are provided in the analog output connector for each option. Both output options are protected by a common surge suppressor (MOV1) and fuse 222.

The power supply circuit 54 consists of three separate power supplies: the +5 VDC LOGIC supply, the +/−15 VDC and +/–12 VDC ANALOG supply, and the +24 VDC ANALOG OUTPUT supply. The LOGIC supply and the ANALOG supply share a common stepdown transformer 200 and signal ground (COM). The ANALOG OUTPUT supply has a separate stepdown transformer 202 and is isolated from the LOGIC and ANALOG signal ground to provide proper isolation for the analog output V/I converter.

A common 2 amp, 250 volt fuse 203 provides short circuit protection for both transformers. Both transformers' primaries are connected to a common jumper circuit that provides selection of 120 or 240 VAC 50/60 incoming power. These jumpers are initially configured for 120 VAC 50/60 HZ, and moving the jumpers enables supply of 240 VAC 50/60 HZ power. A common incoming line filter 204 is provided at the incoming power connections (transformers' primaries) to suppress incoming and outgoing conducted EMI.

The LOGIC and ANALOG supplies are powered by a dual winding 20 VA stepdown transformer (14A-20-515), specifically designed for +5 VDC and +/–15 VDC power supplies. Conventional bridge rectifiers 205 and filter capacitors also at 205 provide unregulated DC to each voltage regulator 206. The voltage regulators provide the necessary line/load regulation to maintain the output voltages within the +/–5% requirement.

In addition to the +/–15 VDC ANALOG supply for the bulk of the analog circuitry, the ADC requires +/–12 VDC. This supply is derived from the +/–15 VDC via series zener diodes. These zeners are biased with additional load resistors to provide +/–12.08 VDC with the 12 mA load of the ADC.

The +24 VDC ANALOG OUTPUT supply is powered by a separate 2.5 VA transformer (14A-2.5-20). This transformer has two 10 VAC secondary windings connected in series to provide 20 VAC. A conventional bridge rectifier and filter capacitor provides 28 volt unregulated filtered DC. Since normal +/–10% line voltage variations could cause this power supply output to exceed the 30 VDC max rating of the V/I converter, a series zener diode and additional bias resistor is used to drop the output to 28.22 VDC max.

The digital display 46 is a 0 to 2 VDC (1.9999 volt), 4½ digit Simpson type M145 LCD panel meter with back lighting. Only 4 of the digits are used and the decimal point is disabled. A precision voltage divider, located on the scaling/output circuit board, rescales the 0 to 5 VDC output signal from opamp 106 to the 0.1 millivolt per degree F required for direct display of temperature in degrees F.

While a specific embodiment of the invention has been shown and described in detail to illustrate the application of the principles of the invention, it will be understood that the invention may be embodied otherwise without departing from such principles.

What is claimed is:

1. A pyrometer for measuring a temperature of a fireside gas stream flowing through a furnace, the gas stream containing water vapor and carbon dioxide land being semi-transparent to wavelengths of near infrared radiation, comprising:

an optical head locatable to view at least forty feet of unobstructed interior of the furnace from one furnace wall short of an opposite furnace wall;

means for supporting the optical head for viewing the unobstructed interior of the furnace;

a photometer circuit connected to said optical head for detecting wavelengths of near infrared radiation produced by water vapor contained within said fireside gas stream and establishing an electrical signal corresponding thereto; and a temperature output indicator connected to said photometer circuit for indicating said temperature of the fireside gas stream corresponding to said electrical signals developed by said photometer circuit.

2. A pyrometer according to claim 1 including:

a power supply connected to a scaling circuit for powering said photometer circuit, said scaling circuit and said temperature output indicator;

said optical head having means for viewing a cone of the fireside gas stream.

3. A pyrometer according to claim 2 comprising means for scaling the electrical signals to correspond to infrared radiation at wavelengths of one of: about 1.38 microns, 1.8 to 2.0 microns, and 2.3 to 3.1 microns.

4. The pyrometer according to claim 2 wherein the supporting means comprised a lens-tube having one end extendable into a port of the furnace and an opposite end, an enclosure connected to the opposite end of the lens-tube, and at least one circuit board in the enclosure for supporting the scaling circuit, the temperature output indicator and the power supply.

5. A pyrometer according to claim 4, including a circuit board in the lens-tube for supporting the photometer circuit.

6. A pyrometer according to claim 5 including a heat shield located at a position around the lens-tube before an entry location of the lens-tube into the furnace port.

7. A pyrometer according to claim 4 including gas cooling means connected to the support means for cooling the optical head.

8. A pyrometer according to claim 4 including gas cooling means connected to the enclosure for cooling the enclosure.

9. A pyrometer according to claim 8 wherein the lens-tube comprises inner and outer tubes with a gas space therebetween, the cooling means including means for supplying a cooling gas to the space between the inner and outer tubes for cooling the optical head.

10. A pyrometer according to claim 9 including a cap with an aperture connected to the end of the lens-tube in the furnace port for directing the cooling gas as it leaves the lens-tube to purge the lens-tube.

11. A pyrometer according to claim 4 wherein the optical head includes a lens for focusing selective ranges of infrared radiation betweem 1.3 and 3.1 microns from the furnace, an IR bandpass filter for passing the focused infrared radiation between about 1.3 and 3.1 microns wavelength, and a photodetector for receiving the focused and filtered radiation.

12. A pyrometer according to claim 11 wherein the photodetector comprises a germanium photodiode.

13. A pyrometer according to claim 4 wherein the optical head includes a lens for focusing infrared radiation from a line-of-sight cone of a solid angle of about 3 to 8 degrees from the port of the furnace, an IR bandpass filter for passing the focused infrared radiation, and a photodetector for receiving the focused and filtered radiation.

14. A pyrometer for measuring a temperature of a fireside gas stream flowing through a furnace, the gas stream containing water vapor and carbon dioxide and being semitransparent to wavelengths of near infrared radiation, comprising:

an optical head locatable to view a cone of the fireside gas stream within an unobstructed interior of the furnace, the cone extending to view at least forty feet of unobstructed interior of the furnace from one furnace wall short of an opposite furnace wall;

means for supporting the optical head for viewing an unobstructed interior of the furnace;

a photometer circuit connected to said optical head for detecting wavelengths of near infrared radiation of about 1.38 microns produced by water vapor contained within said fireside gas stream and establishing an electrical signal corresponding thereto; and a temperature output indicator connected to said photometer circuit for indicating said temperature of the fireside gas stream corresponding to said electrical signals developed by said photometer circuit.

15. A pyrometer for measuring a temperature of a fireside gas stream flowing through a furnace, the gas stream containing water vapor and carbon dioxide and being semitransparent to wavelengths of near infrared radiation, comprising:

an optical head locatable to view a cone of the fireside gas stream within an unobstructed interior of a furnace, the cone extending to view at least forty feet of unobstructed interior of the furnace from one furnace wall short of an opposite furnace wall;

means for supporting the optical head for viewing an unobstructed interior of the furnace;

a photometer circuit connected to said optical head for detecting wavelengths of near infrared radiation of 1.8 to 2.0 microns produced by carbon dioxide contained within said fireside gas stream and establishing an electrical signal corresponding thereto; and a temperature output indicator connected to said photometer circuit for indicating said temperature of the fireside gas stream corresponding to said electrical signals developed by said photometer circuit.

16. A pyrometer for measuring a temperature of a fireside gas stream flowing through a furnace, the gas stream containing water vapor and carbon dioxide and being semitransparent to wavelengths of near infrared radiation, comprising:

an optical head locatable to view a cone of the fireside gas stream within an unobstructed interior of the furnace, the cone extending to view at least forty feet of unobstructed interior of the furnace from one furnace wall short of an opposite furnace wall;

means for supporting the optical head for viewing an unobstructed interior of the furnace;

a photometer circuit connected to said optical head for detecting wavelengths of near infrared radiation of 2.3 to 3.1 microns produced by a mixture of water vapor and carbon dioxide contained within said fireside gas stream and establishing an electrical signal corresponding thereto; and a temperature output indicator connected to said photometer circuit for indicating said temperature of the fireside gas stream corresponding to said electrical signals developed by said photometer circuit.

* * * * *